(12) United States Patent
Shimada et al.

(10) Patent No.: US 9,286,036 B2
(45) Date of Patent: Mar. 15, 2016

(54) COMPUTER-READABLE RECORDING MEDIUM STORING PROGRAM FOR MANAGING SCRIPTS, SCRIPT MANAGEMENT DEVICE, AND SCRIPT MANAGEMENT METHOD

(71) Applicant: FUJITSU LIMITED, Kawasaki-shi, Kanagawa (JP)

(72) Inventors: Kuniaki Shimada, Kawasaki (JP); Yuji Wada, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/557,632

(22) Filed: Dec. 2, 2014

(65) Prior Publication Data

US 2015/0169292 A1  Jun. 18, 2015

(30) Foreign Application Priority Data

Dec. 18, 2013  (JP) .................... 2013-261806

(51) Int. Cl.
*G06F 9/44*  (2006.01)
(52) U.S. Cl.
CPC ........................ *G06F 8/30* (2013.01)
(58) Field of Classification Search
CPC .... G06F 9/45512; G06F 9/45508; G06F 8/30
USPC ........................................... 717/115
See application file for complete search history.

(56) References Cited

U.S. PATENT DOCUMENTS

| | | | |
|---|---|---|---|
| 6,651,241 B1 | 11/2003 | Hernandez, III | |
| 8,522,203 B1* | 8/2013 | Tibbett et al. | 717/115 |
| 2003/0163448 A1* | 8/2003 | Kilemba et al. | 707/1 |
| 2004/0044992 A1* | 3/2004 | Muller et al. | 717/124 |
| 2005/0172338 A1* | 8/2005 | Sandu et al. | 726/22 |
| 2008/0313610 A1* | 12/2008 | Ramsey et al. | 717/115 |
| 2014/0013205 A1* | 1/2014 | Mikhaiel et al. | 715/234 |

FOREIGN PATENT DOCUMENTS

| | | |
|---|---|---|
| JP | 2001-142738 | 5/2001 |
| JP | 2006-260281 | 9/2006 |
| JP | 2009-75940 | 4/2009 |

* cited by examiner

*Primary Examiner* — Ryan Coyer
*Assistant Examiner* — Daniel Wei
(74) *Attorney, Agent, or Firm* — Fujitsu Patent Center

(57) ABSTRACT

A computer executes a process includes: extracting meta commands from commands included in scripts based on number of occurrences of the commands, the plurality of meta commands being commands or sets of a command and argument; extracting specific meta command from the meta commands included in each of the scripts based on information on the number of occurrences of the meta commands included in each of the scripts and information on the scarcity of each of the meta commands in the scripts; and determining resemblance for a pair of scripts that are included in the scripts by calculating a probability that a same combination of meta commands exists in the pair of scripts.

7 Claims, 18 Drawing Sheets

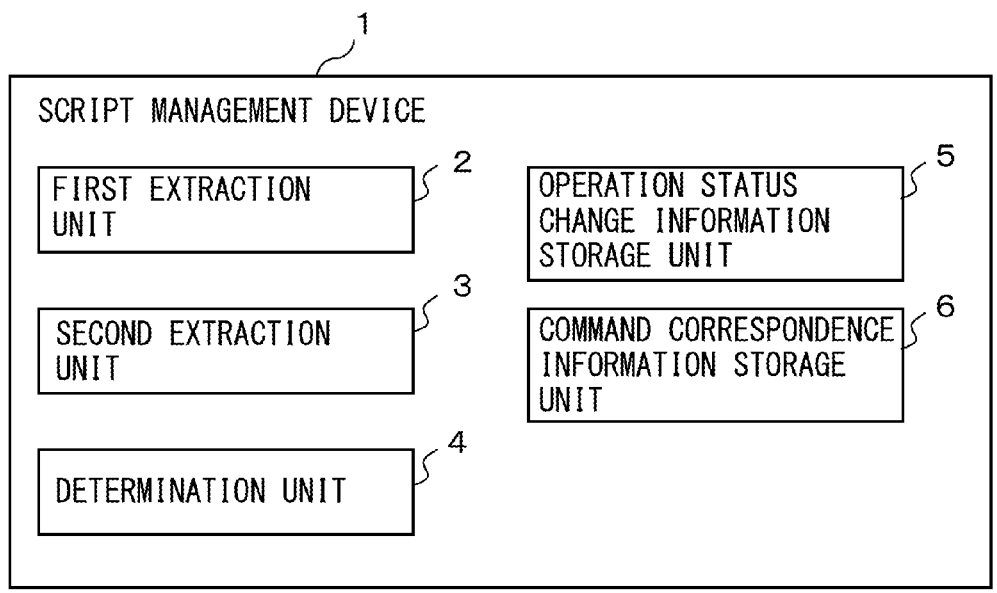
F I G. 1

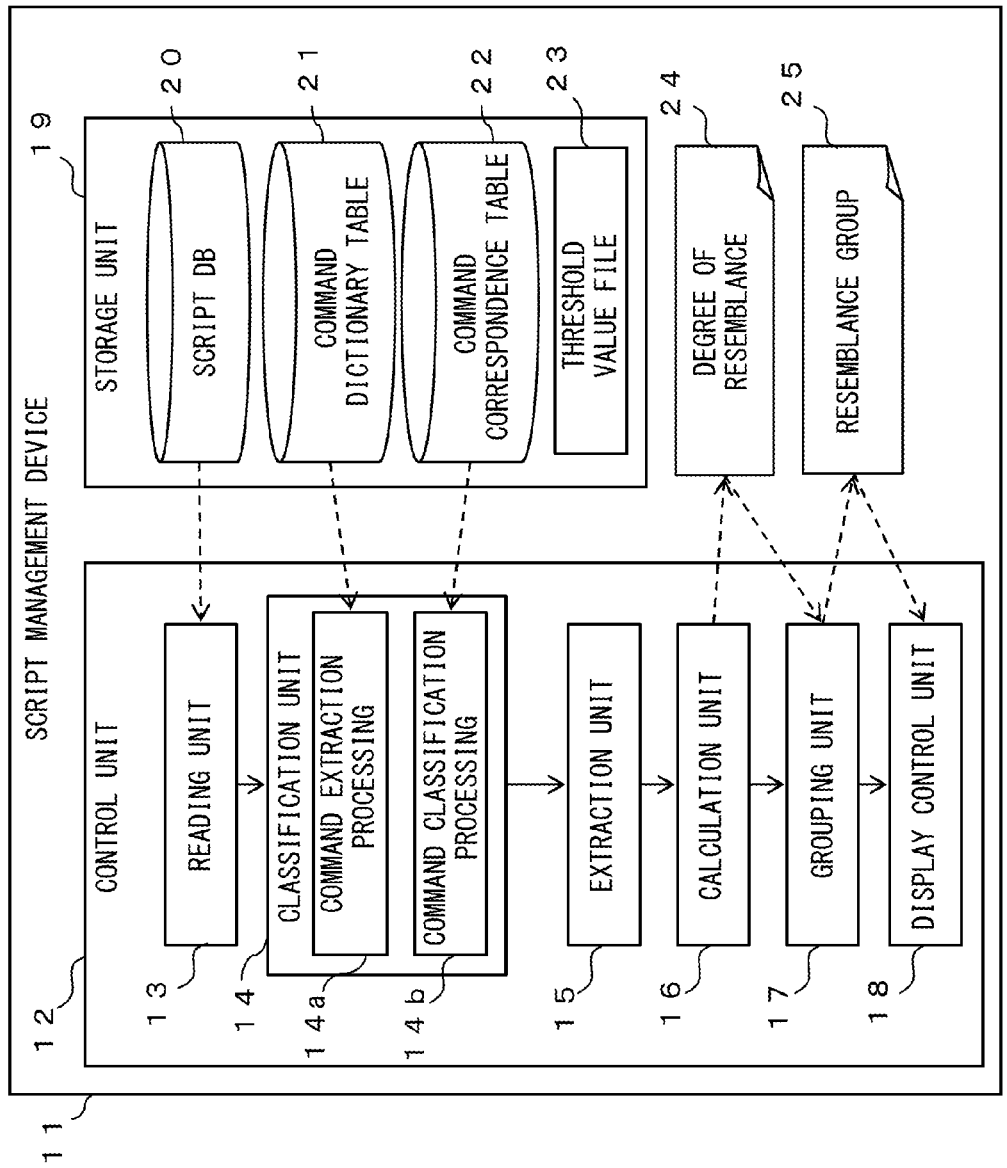
F I G. 2

FIG. 3

SCRIPT A
```
date
ls
service httpd start
cd /root
ls
```

SCRIPT B
```
pwd
service httpd start
date
```

SCRIPT C
```
pwd
date
service ntpd start
cd /etc
ls
```

SCRIPT D
```
date
service ntpd start
cd /home
ls
```

|  | SCRIPT A | SCRIPT B | SCRIPT C | SCRIPT D |
|---|---|---|---|---|
| date | 1 | 1 | 1 | 1 |
| ls | 2 | 0 | 1 | 1 |
| service httpd start | 1 | 1 | 0 | 0 |
| cd | 1 | 0 | 1 | 1 |
| pwd | 0 | 1 | 1 | 1 |
| service ntpd start | 0 | 0 | 1 | 1 |

FIG. 7

|  | SCRIPT A | SCRIPT B | SCRIPT C | SCRIPT D |
|---|---|---|---|---|
| Date | 0 | 0 | 0 | 0 |
| ls | 0.250 | 0 | 0.125 | 0.125 |
| service httpd start | 0.301 | 0.301 | 0 | 0 |
| cd | 0.125 | 0 | 0.125 | 0.125 |
| pwd | 0 | 0.125 | 0.125 | 0.125 |
| service ntpd start | 0 | 0 | 0.301 | 0.301 |

|  | SCRIPT A | SCRIPT B | SCRIPT C | SCRIPT D |
|---|---|---|---|---|
| SCRIPT A | — | — | — | — |
| SCRIPT B | 50% | — | — | — |
| SCRIPT C | 0% | 0% | — | — |
| SCRIPT D | 0% | 0% | 100% | — |

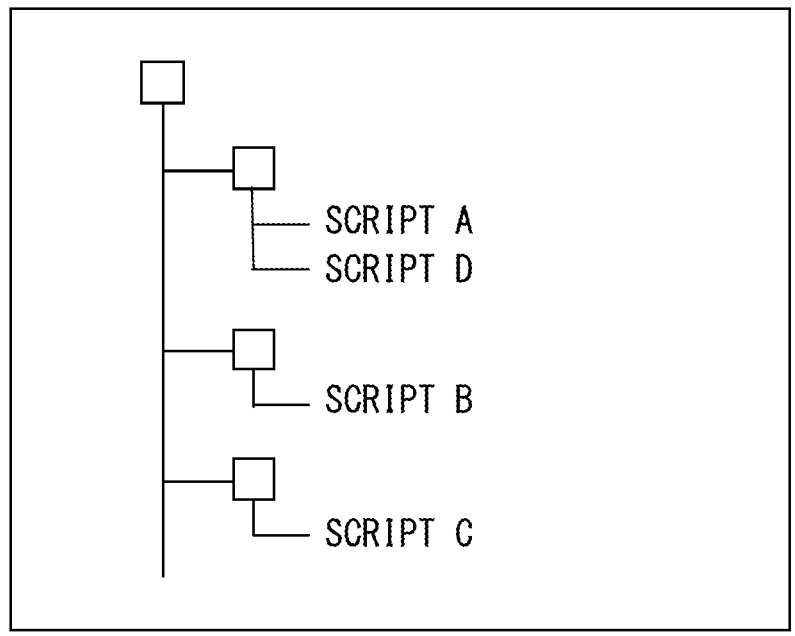
F I G. 1 1

32

| COMMAND | STATUS CHANGE INFORMATION |
|---|---|
| service httpd start | ... |
| service ntpd start | ... |
| ... | ... |

F I G.  1 4

COMPUTER-READABLE RECORDING MEDIUM STORING PROGRAM FOR MANAGING SCRIPTS, SCRIPT MANAGEMENT DEVICE, AND SCRIPT MANAGEMENT METHOD

CROSS-REFERENCE TO RELATED APPLICATION

This application is based upon and claims the benefit of priority of the prior Japanese Patent Application No. 2013-261806, filed on Dec. 18, 2013, the entire contents of which are incorporated herein by reference.

FIELD

The embodiments discussed herein are related to a script management technique.

BACKGROUND

There exists an operation automation tool for reducing a burden of an operator by automating a flow of task processing by making use of a computer. By the provision of an operation automation tool and the sharing of management tasks by a plurality of persons, management of resources such as virtual machines (VM) has begun to be performed more frequently by scripts summarizing individual commands or a flow that can be set without an understanding of the detailed technical content. Here, a script is a generic term for a language by which description and execution of a program can be performed comparatively easily by omitting the transformation task of the language into a language a computer can interpret. In order to perform an operation by using such a flow, a plurality of scripts is combined in an appropriate order in accordance with a purpose. However, when a large number of scripts exist, the scripts need to be classified and distinguished from one another in accordance with the contents of the scripts in order to select and combine appropriate scripts.

Patent document 1: Japanese Laid-open Patent Publication No. 2009-75940
Patent document 2: Japanese Laid-open Patent Publication No. 2001-142738
Patent document 3: Japanese Laid-open Patent Publication No. 2006-260281

SUMMARY

A script management program according to one aspect of the embodiments causes a computer to perform the following processing. The computer extracts a plurality of meta commands from commands included in a plurality of scripts based on number of occurrences of the commands, the plurality of meta commands being commands or sets of a command and argument. The computer extracts specific meta command from the plurality of meta commands included in each of the plurality of scripts based on information on the number of occurrences of the plurality of meta commands included in each of the plurality of scripts and information on the scarcity of each of the plurality of meta commands in the plurality of scripts. The computer determines resemblance for a pair of scripts that are included in the plurality of scripts by calculating a probability that a same combination of meta commands exists in the pair of scripts.

The object and advantages of the embodiments will be realized and attained by means of the elements and combinations particularly pointed out in the claims.

It is to be understood that both the foregoing general description and the following detailed description are exemplary and explanatory and are not restrictive of the embodiments.

BRIEF DESCRIPTION OF DRAWINGS

FIG. 1 illustrates a script management device in an embodiment;
FIG. 2 illustrates an example of the script management device in the present embodiment (first example);
FIG. 3 illustrates examples of scripts stored in a script DB in the present embodiment (first example);
FIG. 7 illustrates an example of the numbers of meta commands existing in each script in the present embodiment (first example);
FIG. 8 illustrates an example of tf-idf values of the meta commands in each script in the present embodiment (first example);
FIG. 10 illustrates examples of degrees of resemblance between summarized scripts in the present embodiment (first example);
FIG. 11 illustrates an example in which resembling scripts are classified and displayed separately in a directory in the present embodiment (first example);
FIG. 14 illustrates an example of a status change command dictionary table in the present embodiment (second example)

DESCRIPTION OF EMBODIMENTS

Figure 4:
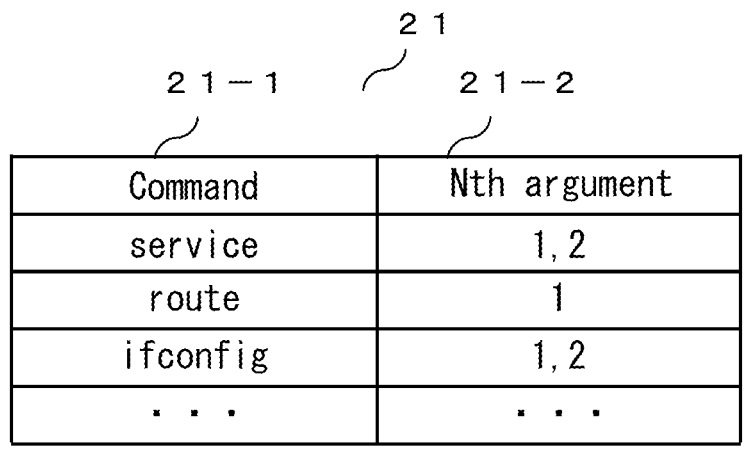
FIG. 4 illustrates an example of a command dictionary table in the present embodiment (first example)

Determining a resemblance between scripts in order to classify or distinguish between the scripts in accordance with the contents of the scripts has been considered. In order to determine a resemblance between scripts, making use of Term Frequency (TF)-Inverse Document Frequency (IDF), which is an important term extraction method in natural language processing, in order to determine a difference between commands configuring a script has been considered.

However, it is not possible to appropriately determine a difference between commands using an important term extraction method that uses a natural language analysis, and therefore, it is not possible to appropriately determine a resemblance between scripts.

The present embodiment provides a script management technique for improving an accuracy of determination of a resemblance between scripts as one aspect.

An operation automation tool includes a workflow database storing a plurality of flows for operations (release management, change management, incident management, monitoring, measures against failures) and a script database storing a plurality of scripts (e.g., sh, ruby, perl, etc.). In the following a database is referred to as a DB.

Conventionally, scripts for operations are not put together for management, but in recent years, they have begun to be put together accompanying a flow of operation automation, and therefore, it has become difficult to find a script that is needed. For example, the number of stored scripts is on the order of several thousand, and therefore, effort is necessary in order to find a script that is needed therefrom.

Further, in a cloud system, there exist scripts for different targets (type of hardware of each server, type of an operating system (OS), type of a hypervisor, kind of installed application). As the cloud becomes complicated as described above, the number of patterns of combinations of scripts increases.

Because of this, making use of the TF-IDF, which is an important term extraction method in natural language processing, has been considered.

However, in the case where the task is to extract only important commands from scripts by using the TF-IDF, important terms in text can be extracted, but there is a case where classification of commands will not be performed appropriately for the following reasons.

For example, in the case where a command has a syntactic configuration, and arguments of a specific portion are different, the commands having different arguments need to be recognized as different commands, but it is not possible to distinguish therebetween by using the TF-IDF.

Further, in the case where there exists a difference between environments due to, for example, a difference between hypervisors, there is a case where the notations are different even though the commands have the same contents. However, it is not possible to uniformly determine how to match the recognition by the TF-IDF with the case where notations are different.

As described above, in order to determine a resemblance between scripts, a difference between commands configuring the scripts is determined. However, a syntax exists in a command, and therefore, it is not possible to appropriately determine a difference between commands by using only the important term extraction method using the natural language analysis, and as a result, it is also not possible to appropriately determine a resemblance between scripts.

Further, there exists a portion where the content of a script changes in accordance with an environment and unless the command is recognized as the same even though the command content has changed in accordance with the environment, it is not possible to correctly determine a resemblance between scripts.

Because of this, in the present embodiment, a script management technique that has an improved accuracy in a determination of a resemblance between scripts is provided.

FIG. 1 illustrates a script management device in the present embodiment. A script management device 1 includes a first extraction unit 2, a second extraction unit 3, and a determination unit 4.

The first extraction unit 2 extracts a plurality of meta commands, which are commands or sets of a command and an argument, from commands included in a plurality of scripts, on the basis of the number of occurrences. An example of the first extraction unit 2 is a classification unit 14. Here, the meta commands include a set of combinations of a command and an argument, in addition to the set of all the commands.

The second extraction unit 3 extracts specific meta commands from meta commands included in each of the plurality of scripts on the basis of information on the number of occurrences of the plurality of meta commands included in each of the plurality of scripts and the scarcity of the plurality of meta commands of each of the plurality of scripts. An example of the second extraction unit 3 is an extraction unit 15.

The determination unit 4 makes a comparison between each of the plurality of scripts. The determination unit 4 calculates a probability that a combination of meta commands that are the same will exist in combinations of extracted specific meta commands. The determination unit 4 determines that the compared scripts resemble each other on the basis of the probability. Examples of the determination unit 4 include a calculation unit 16 and a grouping unit 17.

With a configuration such as this, it is possible to improve the accuracy of determination of a similarity/dissimilarity between scripts.

Further, in the case where there is a plurality of sets of a command and an argument in which the command and the argument are the same, in each of the plurality of scripts, the first extraction unit 2 may extract the sets of a command and an argument as the one same meta command.

Furthermore, in the case where there is a plurality of commands that are the same but whose arguments are different from one another in each of the plurality of scripts, the first extraction unit 2 may extract each command as the same meta command.

The script management device 1 further includes an operation status change information storage unit 5. The operation status change information storage unit 5 stores operation status change information on the change in the operation status of an information processing device caused by the execution of each command. In the case where there is a plurality of commands that are the same but whose arguments are different from one another in each of the plurality of scripts, the first extraction unit 2 acquires operation status change information corresponding to each of the commands that have been executed from the operation status change information storage unit 5. In the case where the contents of the operation status change information corresponding to one executed command are different from those corresponding to another executed command, the first extraction unit 2 may extract the executed commands as meta commands that are different from each other. An example of the operation status change information storage unit 5 is a status change command dictionary table 33.

The script management device further includes a command correspondence information storage unit 6. The command correspondence information storage unit 6 stores command correspondence information in which commands whose notation methods are different in accordance with a system environment are associated with each other. At this time, the first extraction unit 2 may classify commands whose notation methods are different but which indicate the same meaning as the same meta command on the basis of the correspondence information. An example of the command correspondence information storage unit 6 is a command correspondence table 22.

An example of the present embodiment is described below in detail.

First Example

FIG. 2 illustrates an example of a script management device in the present embodiment (first example). A script management device 11 includes a control unit 12 and a storage unit 19. The storage unit 19 stores a script DB 20, a command dictionary table 21, the command correspondence table 22, and a threshold value file 23. The script DB 20 stores a plurality of scripts used in an operation automation tool. The command dictionary table 21 is a dictionary table for managing commands and arguments used in the commands. The command correspondence table 22 is a table in which commands that have notations used in scripts that are different in accordance with a system environment but which indicate the same meaning are associated with each other. In the threshold value file 22, threshold values used in the processing, to be described later, are stored.

The control unit 12 functions as a reading unit 13, the classification unit 14, the extraction unit 15, the calculation unit 16, the grouping unit 17, and a display control unit 18.

The reading unit 13 reads a plurality of scripts from the script DB 20.

The classification unit 14 classifies commands as the same commands or different commands in accordance with the frequency of occurrence of the commands or sets of a command and an argument. More specifically, the classification unit 14 performs command extraction processing 14a and command classification processing 14b. In the command extraction processing 14a, the classification unit 14 refers to the command dictionary table 21 and extracts commands of each script together with their arguments. In the case of a command that is not included in the command dictionary table 21, the command is handled as a command without argument and only the command is extracted. In the command classification processing 14b, the classification unit 14 classifies commands. For example, there is a case where the notations for a command in a read plurality of scripts are different in accordance with a system environment, and therefore, the classification unit 14 classifies commands indicating the same meanings but having different notations as the same command by using the command correspondence table 22. In the case where there is a plurality of commands that are the same in each script, the classification unit 14 classifies commands whose argument values are different as different commands.

The extraction unit 15 extracts important commands from the commands classified by the classification unit 14 in each script The resemblance degree calculation unit 16 calculates a ratio of the number of combinations of important commands that are the same to the number of all the combinations of the important commands included in two scripts to be compared with each other as a degree of resemblance (24) between the two scripts.

The grouping unit 17 determines that scripts in which the degree of resemblance is equal to or greater than a threshold value resemble each other and groups the scripts into a resemblance group 25.

The display control unit 18 performs display control so that the grouped scripts (resemblance group 25) are displayed in the same directory.

FIG. 3 illustrates examples of scripts stored in the script DB in the present embodiment (first example). In the present embodiment, it is assumed that in the script DB 20, four scripts (script A, script B, script C, script D) are stored.

A "date" command is a command for displaying a system date. An "ls" command is a command for displaying a file list (including directories) of a current directory. A "service" command starts or stops a service, or checks a status. A "cd" command is a command for changing the current directory. A "pwd" command is a command for displaying a current directory name.

In accordance with a command, arguments are used when the command is executed and it is possible to specify a predetermined argument (option) of the arguments. An argument is used to specify a file name, a directory name, a message to be output, etc., used at the time of execution. On the other hand, an option is used to specify, for example, the behavior of the command. For example, in the case of the "service" command, "httpd" of "service httpd start" is an argument and "start" is an option.

FIG. 4 illustrates an example of a command dictionary table in the present embodiment (first example). The command dictionary table 21 includes data items of "Command" 21-1 and "Nth argument" 21-2. In "Command" 21-1, command names are stored. "Nth argument" 21-2 indicates that up to n arguments are specified by the command. For example, in the same row of the command "service", "1, 2" is stored in "Nth argument" 21-2, and this indicates that a first argument and a second argument are specified in "service".

Figure 5:
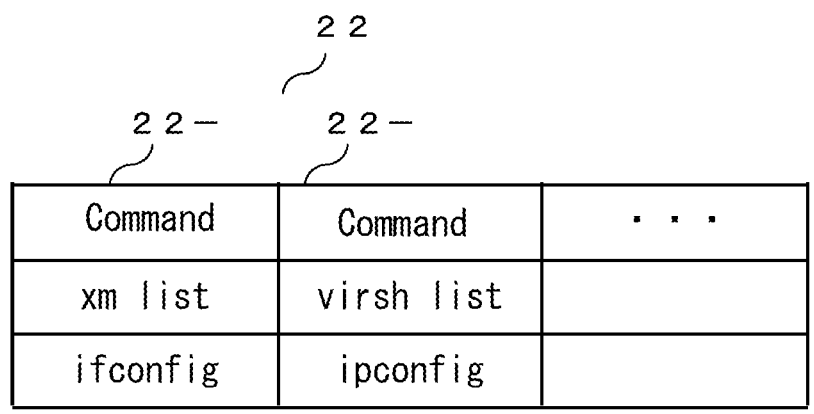
FIG. 5 illustrates an example of a command correspondence table in the present embodiment (first example)

FIG. 5 illustrates an example of a command correspondence table in the present embodiment (first example). In the command correspondence table 22, commands are stored in association with one another for each kind of notation. In the column "Command" 22-1, for example, commands used when the kind of a hypervisor used in a virtualized environment is Xen are stored. In the column "Command" 22-2, for example, commands used when the kind of a hypervisor used in a virtualized environment is KVM are stored. A command "xm list" used in the case of Xen and a command "virsh list" used in the case of KVM have different notations, but they indicate the same meaning, and therefore, they are stored in association with each other.

Figure 6:
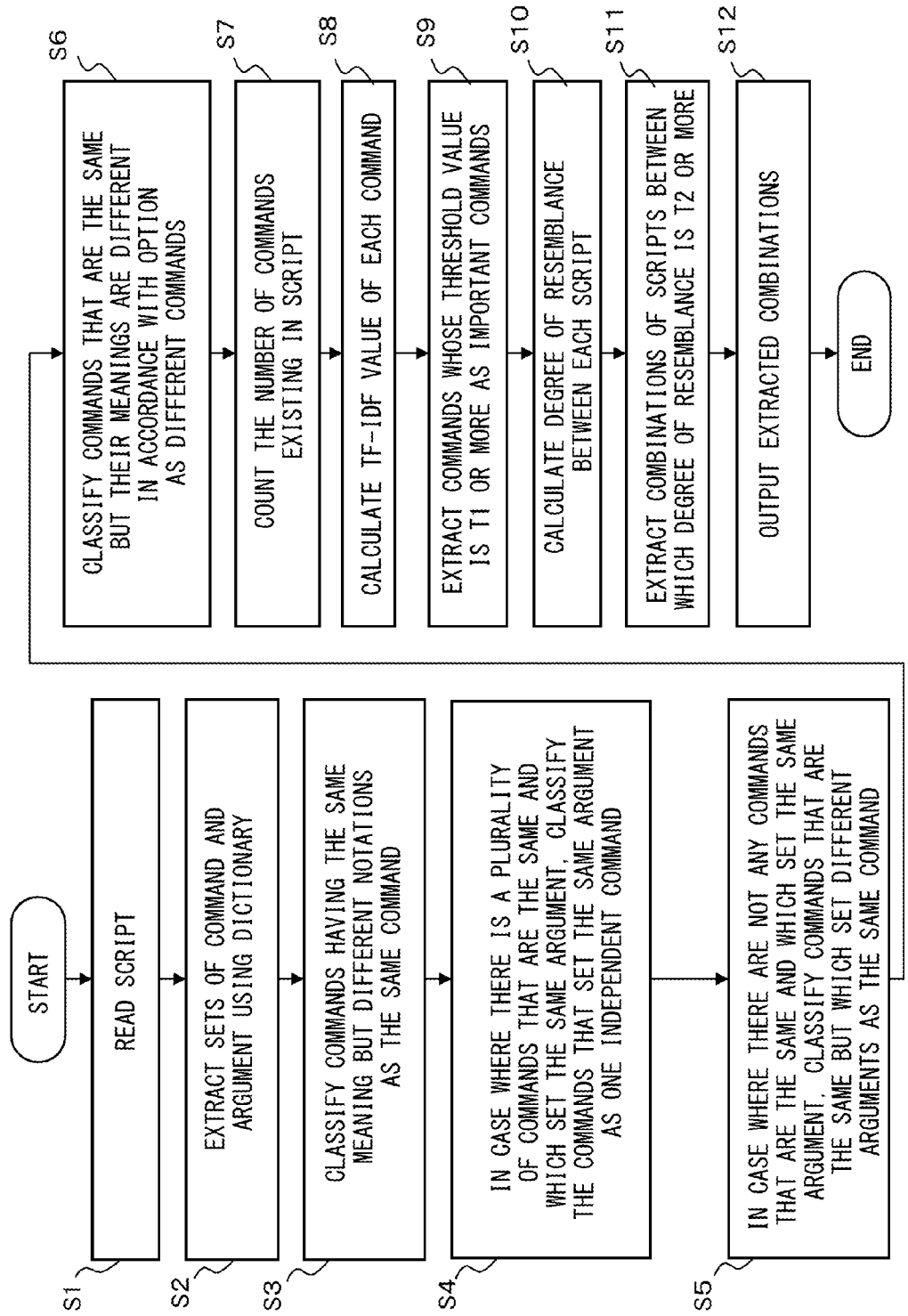
FIG. 6 illustrates an example of a flow of script management processing in the present embodiment (first example)

FIG. 6 illustrates an example of a flow of script management processing in the present embodiment (first example). In the following, with reference to FIG. 7 to FIG. 11, the flow in FIG. 6 is explained.

The reading unit 13 reads a plurality of scripts (e.g., scripts A to D) from the script DB 20 (S1).

Next, the classification unit 14 refers to the command dictionary table 21 and extracts sets of a command and an argument of the command within the script. For example, in the case of the "service" command, the command has the first argument and the second argument on the basis of the command dictionary table 21, and therefore, the classification unit 14 extracts "service http start" (S2). The classification unit 14 extracts a command alone from among the commands within the script if the command does not exist in the command dictionary table 21.

Next, there is a case where notations for a command are different in accordance with a system environment in the read plurality of scripts, and therefore, the classification unit 14 classifies commands that indicate the same meaning but the notations of which are different as the same command by using the command correspondence table 22 (S3). For example, the classification unit 14 makes the same the notations for commands that indicate the same meaning but the notations of which are different by converting one of the notations into the other by using the command correspondence table 22. For example, the "xm list" command is converted into the "virsh list".

Next, in the case where there is a plurality of commands that are the same and which set the same argument, the classification unit 14 classifies the commands that set the same argument as one independent command (S4). For example, for the "service" command, there are two "service httpd start" commands and there are two "service ntpd start" commands in the scripts A to D. In this case, the classification unit 14 classifies "service httpd start" and "service ntpd start" as different commands.

On the other hand, in the case where there are not any commands that are the same and which set the same argument, the classification unit 14 classifies commands that are the same but which set different arguments as the same command (S5). For example, for the "cd" command, there is one "cd/root", there is one "cd/etc", and there is one "cd/home" in each script. In this case, the command "cd" that sets the same argument does not exist in each script, and therefore, the classification unit 14 classifies each of "cd/root", "cd/etc", and "cd/home" as the "cd" command.

Further, the classification unit 14 classifies a command whose meaning is different for different options even though the command is the same as two different commands, as in the case of the "service" command (S6). Examples of the "service" command whose meaning is different for different options even though the command is the same include "service httpd start" (that starts httpd process) and "service httpd stop" (that stops httpd process).

Next, the extraction unit 15 counts the number of commands existing in each script (commands classified at S4 and S6) as illustrated in FIG. 7 (S7). In the following, a set of the commands classified at S4 to S6, i.e., a set of all the commands, and combinations of a command and an argument is referred to as a meta command.

Next, the extraction unit 15 calculates a tf-idf value (Wi,j) of each meta command i in a script j by using an expression below (S8). The results of calculation of the tf-idf value (Wi,j) of each meta command in the scripts A, B, C, and D are illustrated in FIG. 8.

$$W_{i,j} = tf_{i,j} \times \log(N/df_i)$$

$tf_{i,j}$: the number of meta commands within the script j
$df_i$: the number of scripts including meta commands
N: the total number of scripts.

Figure 9:
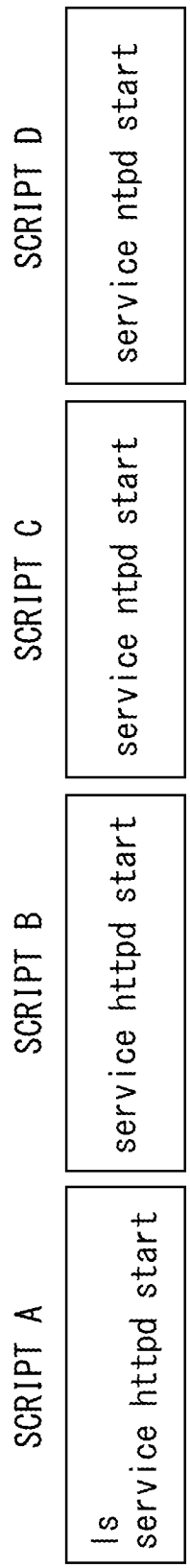
FIG. 9 illustrates examples of summarized scripts in the present embodiment (first example)

Next, the extraction unit 15 reads a threshold value T1 stored in the threshold value file 22 and extracts meta commands whose tf-idf value is equal to or greater than the threshold value T1 from the meta commands whose tf-idf value has been calculated as important commands (S9). Here, it is assumed that the threshold value T1 is, for example, 0.25. Then, the meta commands illustrated in FIG. 9 are extracted from each script. In the following, a script in which only the important commands are left is referred to as a summarized script.

Next, the calculation unit 16 calculates a degree of resemblance between the summarized scripts (S10) on the basis of the important commands extracted at S9. The degree of resemblance between the summarized scripts is a probability that the same command will exist in (the number of commands of a summarized script X×the number of commands of a Y script) combinations, where X and Y denote summarized scripts. For example, in the case of FIG. 9, the degree of resemblance between the summarized scripts A and B is the number of important commands that are the same/(the number of commands of the summarized script A×the number of commands of the summarized script B)=½=50(%). By calculating the degree of resemblance between all the combinations of the scripts, the results in FIG. 10 are obtained.

Next, the grouping unit 17 reads a threshold value T2 stored in the threshold value file 22 and extracts sets of scripts between which the degree of resemblance between the summarized scripts is equal to or greater than the threshold value T2 (resemblance groups) (S11). Here, if it is assumed that the threshold value T2 is, for example, 0.5, in the case of FIG. 10, a group of the script A and the script B and a group of the script C and the script D are obtained as resemblance groups.

The display control unit 18 displays the resemblance groups extracted at S11 within the same directory as illustrated in FIG. 11 (S12).

Second Example

In a second example, in addition to the classification in the first example, commands are further classified in accordance with the use status of a command.

Figure 12:
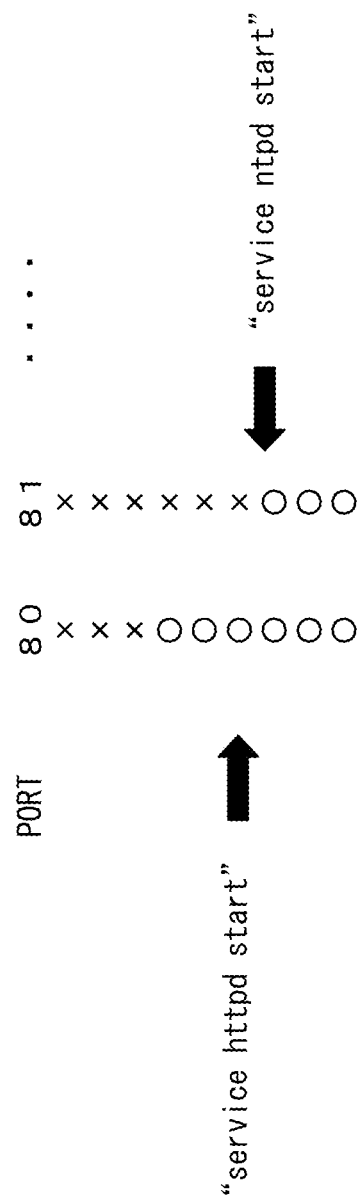
FIG. 12 is a diagram explaining processing to associate with each other a status change of a command log of a server and a command that has caused the status change in an embodiment (second example)

FIG. 12 is a diagram explaining processing to associate the status change of a command log of the server and a command that has caused the status change with each other in the present embodiment (second example). For example, the script management device 11 acquires a log of the server to be executed by an operation automation tool and monitors statuses, such as the service activation status of the server and the port-use status.

For example, when the log of the port-use status is focused on, the status of the port use is changed in accordance with the results of the execution of a command as illustrated in FIG. 12. For example, in the case where the command "service httpd start" has been executed, the status of the port number=80 is changed. In this case, the script management device 11 associates the command "service httpd start" with information indicative of the fact that the port number=80 has been turned ON and then registers the command in a status change command dictionary table, to be described later.

Further, in the case where the command "service ntpd start" has been executed, the status of the port number=81 is changed. In this case, the script management device 11 associates the command "service ntpd start" with information indicative of the fact that the port number=81 has been turned ON and then registers the command in the status change command dictionary table, to be described later.

Figure 13:
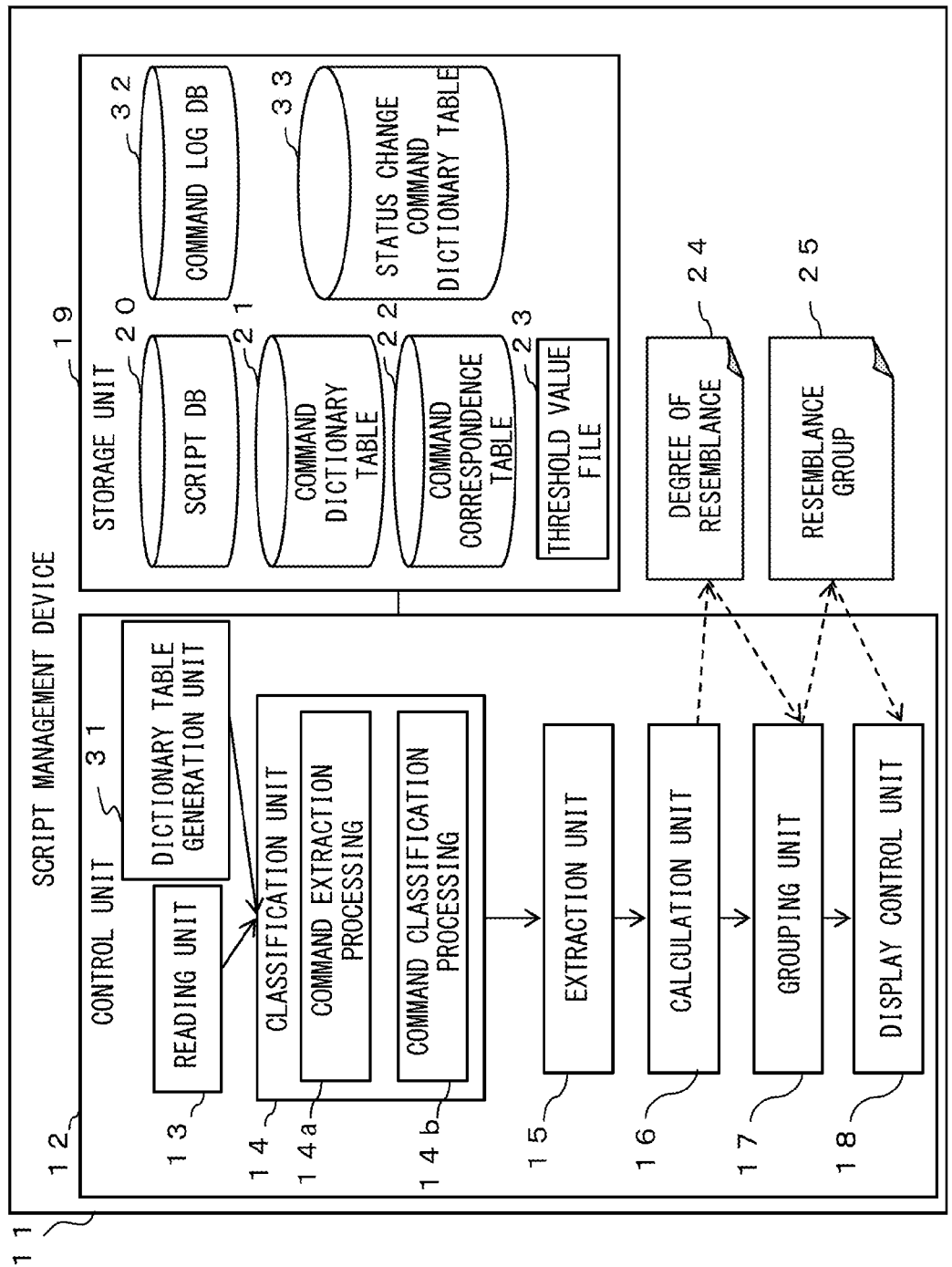
FIG. 13 illustrates an example of a script management device in the present embodiment (second example)

FIG. 13 illustrates an example of the script management device in the present embodiment (second example). The script management device 11 is the same as the script management device 11 in FIG. 2 except in that a dictionary table generation unit 31, a command log DB 32, and the status change command dictionary table 33 are added. To the same components or the same functions as those in the first example, the same symbols as those used in the first example are attached and explanation thereof is omitted.

The storage unit 19 stores the script DB 20, the command dictionary table 21, the command correspondence table 22, the threshold value file 23, the command log DB 32, and the status change command dictionary table 33. In the command log DB 32, logs of the server to be executed by the operation automation tool are stored. In the status change command dictionary table 33, commands and information whose status has been changed by the execution of the commands are stored in association with each other.

The control unit 12 functions as the reading unit 13, the classification unit 14, the extraction unit 15, the calculation unit 16, the grouping unit 17, the display control unit 18, and the dictionary table generation unit 31. The dictionary table generation unit 31 generates the status change command dictionary table 33 by using the command log DB 32.

FIG. 14 illustrates an example of the status change command dictionary table in the present embodiment (second example). In the status change command dictionary table 33, commands and information whose status has been changed by the execution of the commands are stored in association with each other.

Figure 15:
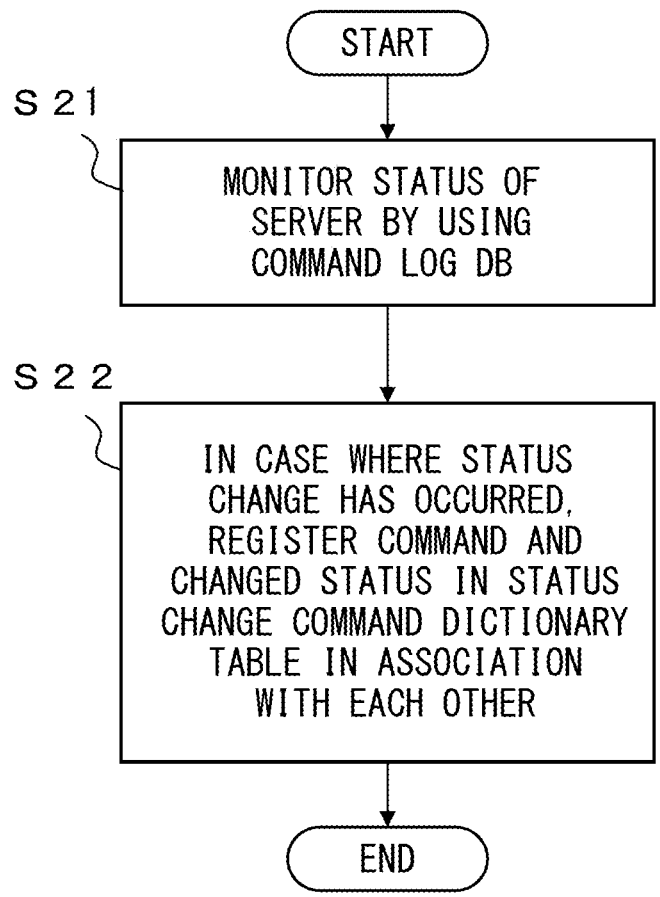
FIG. 15 illustrates an example of a flow of status change command dictionary table generation processing in the present embodiment (second example)

FIG. 15 illustrates an example of a flow of status change command dictionary table generation processing in the present embodiment (second example). The dictionary table generation unit 31 monitors the statuses of the server, such as the service activation status of the server and the port-use status by using the command log DB 32 (S21).

When the status is changed in accordance with the results of the execution of a command, the dictionary table generation unit 31 stores the command and information whose status has been changed by the execution of the command in association with each other in the status change command dictionary table 33 (S22).

Figure 16:
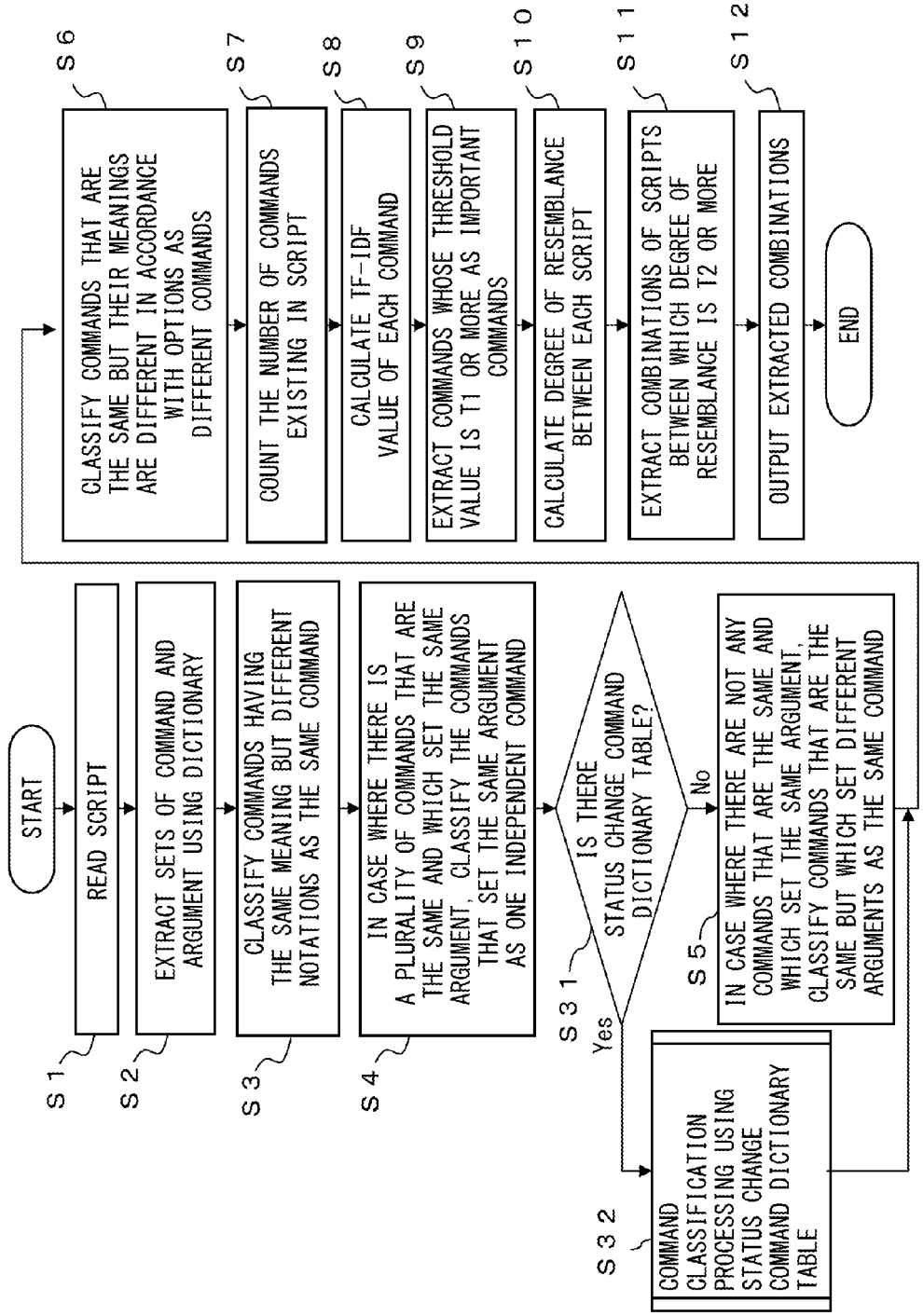
FIG. 16 illustrates an example of a flow of script management processing in the present embodiment (second example)

FIG. 16 illustrates an example of a flow of script management processing in the present embodiment (second example). The flow in FIG. 16 is the same as that in FIG. 6 except in that the processing at S31 and S32 is added. In the case where the status change command dictionary table 33 is stored in the storage unit 19 ("Yes" at S31), the classification unit 14 performs command classification processing using the status change command dictionary table 33 (S32). Details of S32 will be explained by using FIG. 17. In the second example, a set of the commands classified at S4 to S6 and S32, i.e., the set of all the commands, and combinations of commands and arguments is referred to as a meta command.

Figure 17:
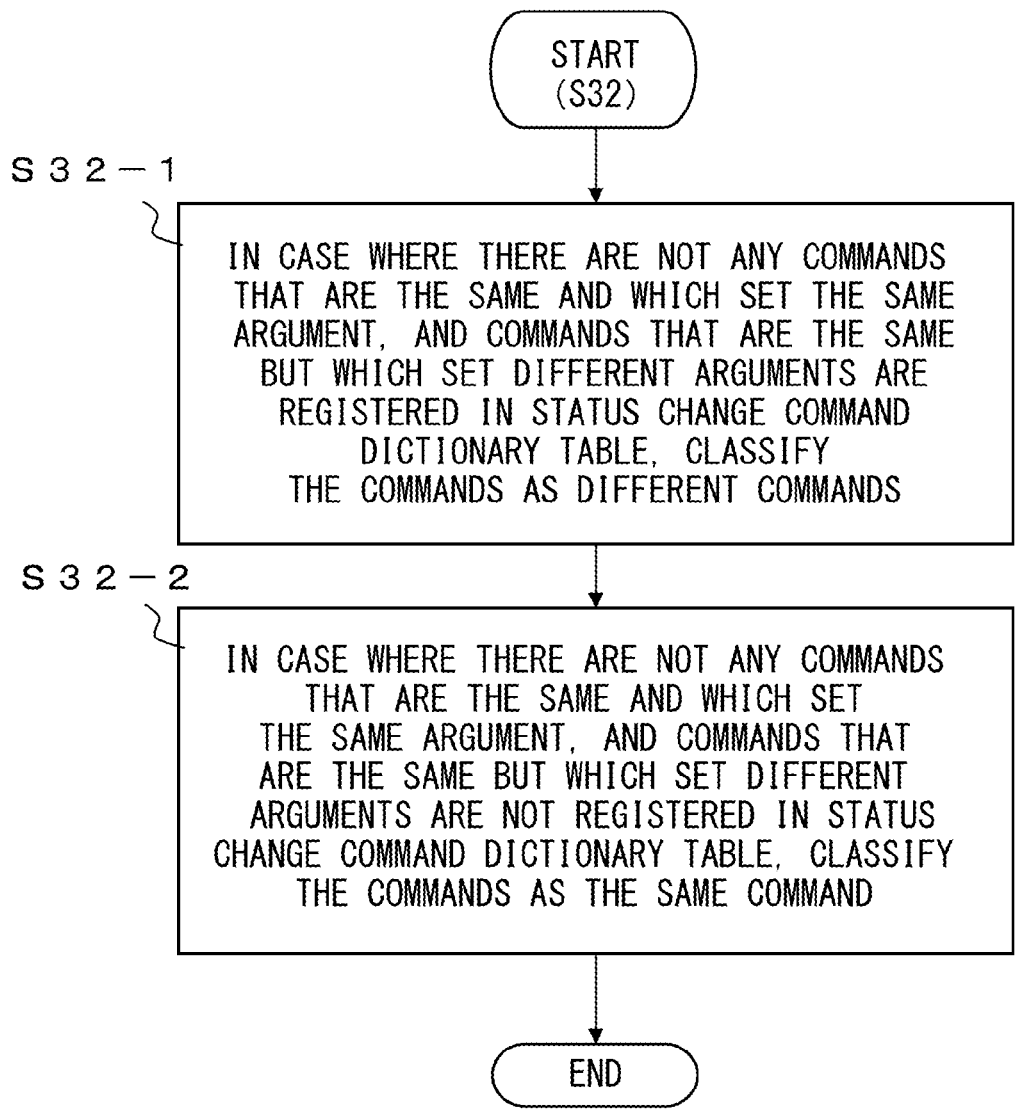
FIG. 17 illustrates an example of a detailed flow of command classification processing (S32) using a status change command dictionary table 33 in the present embodiment (second example)

FIG. 17 illustrates an example of a detailed flow of the command classification processing (S32) using the status change command dictionary table 33 in the present embodiment (second example). The classification unit 14 performs the following processing on commands that have not been classified at S14, i.e., commands that do not have the same command that sets the same argument.

In the case where there is not a plurality of commands that are the same and which set the same argument, in other words, in the case where there are commands that are the same but whose arguments are different from one another, the classification unit 14 performs the following processing. In other words, the classification unit 14 makes an inquiry to the status change command dictionary table 33 about the commands that are the same but which have set different arguments. In the case where the commands that are the same but which have set different arguments are registered in the status change command dictionary table 33, the classification unit 14 acquires the status change information of the commands. The classification unit 14 compares the status change information between the commands that are the same but which have set different arguments, and in the case where the portions of the changed status are different, the classification unit 14 classifies the commands as different commands (S32-1).

For example, it is assumed that there is a script in which a command "service httpd start" and a command "service ntpd start" each exist at step 32-1. In this case, it can be said that "service httpd start" and "service ntpd start" are the same command, but that different arguments are set. In this case, the classification unit 14 acquires status change information corresponding to "service httpd start" and status change information corresponding to "service ntpd start" from the status change command dictionary table 33. Here, it is assumed that the status change information corresponding to "service httpd start" is information indicative of the fact that the port number=81 has been turned on and the status change information corresponding to "service ntpd start" is information indicative of the fact that the port number=80 has been turned on. In this case, the portions of the changed status are different between the two pieces of status change information, and therefore, the classification unit 14 classifies the command "service httpd start" and the command "service ntpd start" as commands that are different from each other.

The classification unit 14 performs the processing at S5 on commands that have not been classified at S32-2, i.e., on the commands that are the same but whose arguments are different from one another and which are not registered in the status change command dictionary table 33 (S32-2). In other words, the classification unit 14 classifies commands that are the same but whose arguments are different from one another and which are not registered in the status change command dictionary table 33 as the same command. After that, the classification unit 14 performs the processing at S6.

At S5 and S32-2, in the case where there are not any commands that are the same and which set the same argument, the classification unit 14 classifies the commands that are the same but which set different arguments as the same command, but in the case where their arguments are different, the classification unit 14 may classify the commands as commands that are different from one another.

By using the first or second example, it is possible to improve the accuracy of the determination of a resemblance between scripts. Further, scripts in the resemblance group are displayed in the same directory on the display, and therefore, it is possible to easily find a target script.

Figure 18:
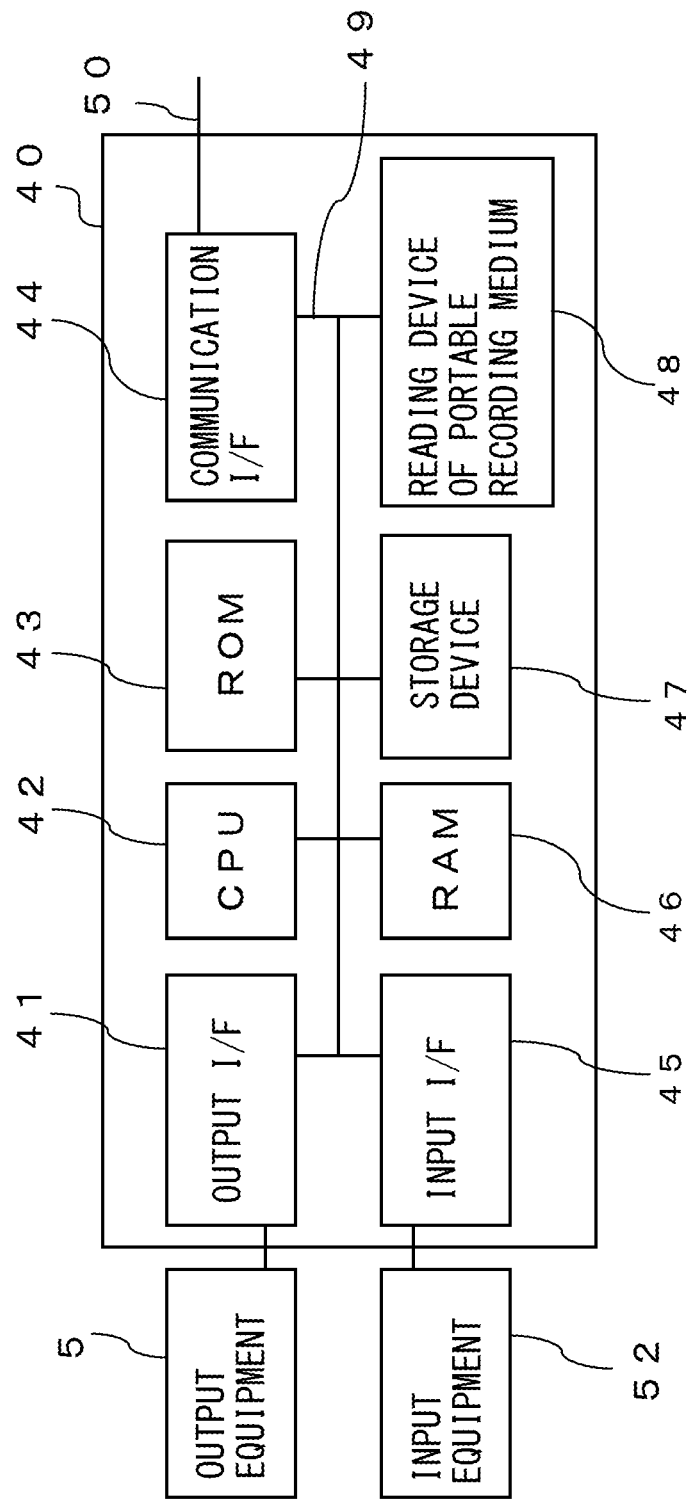
FIG. 18 is an example of a configuration block diagram of a hardware environment of a computer that executes programs in the present embodiment.

FIG. 18 is an example of a configuration block diagram of a computer hardware environment for executing programs in the present embodiment. A computer 40 functions as the script management device 11. The computer 40 includes a CPU 42, a ROM 43, a RAM 46, a communication I/F 44, a storage device 47, an output I/F 41, an input I/F 45, a reading device 48, a bus 49, output equipment 51, and input equipment 52.

Here, the CPU is an example of a processor and CPU stands for Central Processing Unit. ROM stands for Read-Only Memory. RAM stands for Random Access Memory. I/F stands for InterFace. To the bus 49, the CPU 42, the ROM 43, the RAM 46, the communication I/F 44, the storage device 47, the output I/F 41, the input I/F 45, and the reading device 48 are connected. The reading device 48 is a device for reading a portable recording medium. The output equipment 51 is connected to the output I/F 41. The input equipment 52 is connected to the input I/F 45.

As the storage device 47, it is possible to use storage devices of various types, such as a hard disk, a flash memory, and a magnetic disc. The storage device 47 or the ROM 43 stores programs for causing the CPU 42 to function as the reading unit 13, the classification unit 14, the extraction unit 15, the calculation unit 16, the grouping unit 17, the display control unit 18, and the dictionary table generation unit 31. Further, the storage device 47 or the ROM 43 stores the script DB 20, the command dictionary table 21, the command correspondence table 22, the threshold value file 23, the command log DB 32, and the status change command dictionary table 33. In the RAM 46, the degree of resemblance 23 and the resemblance groups are stored temporarily.

The CPU 42 reads programs for implementing the processing explained in the above-described embodiments stored in the storage device 47, etc., executes the programs, and thus functions as the control unit 12.

The programs for implementing the processing explained in the above-described embodiments may be stored, for example, in the storage device 47 from the program provider side via the communication network 50 and the communication I/F 44. Further, the programs for implementing the processing explained in the above-described embodiments may be stored in a portable recording medium sold and distributed on the market. In this case, the programs may be read and executed by the CPU 42 after the portable recording medium is set in the reading device 48. As the portable recording medium, it is possible to use recording media of various types, such as a CD-ROM, a flexible disc, an optical disc, a magneto-optical disc, an IC card, or a USB memory device. Programs stored in such recording media are read by the reading device 48.

Further, as the input equipment 52, it is possible to use a keyboard, a mouse, an electronic camera, a Web camera, a microphone, a scanner, a sensor, and a tablet. As the output equipment 51, it is possible to use a display, a printer, and a speaker. Further, the network 50 may be a network, such as the Internet, a LAN, a WAN, a dedicated line network, a wired network, and a wireless network.

According to the script management technique according to one aspect of the present embodiment, it is possible to improve the accuracy of the determination of a similarity/dissimilarity between scripts.

The present embodiments are not limited to those described above and various configurations or embodiments can be embodied in the scope not deviating from the gist of the present embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a managing program that causes a computer to execute a process comprising:
    extracting a plurality of meta commands from commands included in a plurality of scripts based on number of occurrences of the commands, the plurality of meta commands being commands or sets of a command and argument;
    extracting specific meta command from the plurality of meta commands included in each of the plurality of scripts based on information on the number of occurrences of the plurality of meta commands included in each of the plurality of scripts and information on the scarcity of each of the plurality of meta commands in the plurality of scripts; and
    determining resemblance for a pair of scripts that are included in the plurality of scripts by calculating a probability that a same combination of meta commands exists in the pair of scripts, wherein
    in a case where there is a plurality of commands that are the same but whose arguments are different from one another in each of the plurality of scripts, the extracting a plurality of meta commands acquires, from a storage device, operation status change information on a change in the operation status of an information processing device due to the execution of each of the commands, and performs an extraction by regarding the commands as respective meta commands that are different from one another when a content of operation status change information acquired for each of the commands is different between the same commands, and wherein
    the extracting a plurality of meta commands performs an extraction by regarding commands whose notation methods are different but which indicate the same meaning as the same meta command on the basis of command correspondence information in which commands whose notation methods are different in accordance with a system environment are associated with one another.

2. The non-transitory computer-readable recording medium according to claim 1, wherein
    in a case where there is a plurality of sets of a command and an argument, in which the command and the argument are the same, in each of the plurality of scripts, the extracting a plurality of meta commands performs an extraction by regarding the sets of a command and an argument as the one same meta command.

3. The non-transitory computer-readable recording medium according to claim 1, wherein
    in a case where there is a plurality of commands that are the same but whose arguments are different from one another in each of the plurality of scripts, the extracting a plurality of meta commands performs an extraction by regarding each of the commands as the same meta command.

4. A script management device comprising:
    a processor configured to execute a process including:
    extracting a plurality of meta commands from commands included in a plurality of scripts based on the number of occurrences of the commands, the plurality of meta commands being commands or sets of a command and argument;
    extracting specific meta commands from the plurality of meta commands included in each of the plurality of scripts based on information on the number of occurrences of the plurality of meta commands included in each of the plurality of scripts and information on the scarcity of each of the plurality of meta commands in the plurality of scripts; and
    determining resemblance for a pair of scripts that are included in the plurality of scripts by calculating a probability that a same combination of meta commands exists in the pair of scripts,
    an operation status change information storage unit configured to store operation status change information about a change in the operation status of an information processing device due to the execution of each of the commands, wherein
    in a case where there is a plurality of commands that are the same but whose arguments are different from one another in each of the plurality of scripts, the extracting a plurality of meta commands acquires, from the operation status change information storage unit, the operation status change information corresponding to each of executed commands, and performs an extraction by regarding the commands that have been executed as respective meta commands that are different from one another when a content of operation status change information acquired for each of the commands is different between the same commands, and
    a command correspondence information storage unit configured to store command correspondence information in which commands whose notation methods are different in accordance with a system environment are associated with one another, wherein the extracting a plurality of meta commands performs an extraction by regarding commands whose notation methods are different but which indicate the same meaning as the same meta command on the basis of the command correspondence information.

5. The script management device according to claim 4, wherein in a case where there is a plurality of sets of a command and an argument, in which the command and the argument are the same, in each of the plurality of scripts, the extracting a plurality of meta commands performs an extraction by regarding the sets of a command and an argument as the one same meta command.

6. The script management device according to claim 4, wherein in a case where there is a plurality of commands that are the same but whose arguments are different from one another in each of the plurality of scripts, the extracting a plurality of meta commands performs an extraction by regarding each of the commands as the same meta command.

7. A script management method performed by a computer, the method comprising:

extracting a plurality of meta commands from commands included in a plurality of scripts on the basis of the number of occurrences of the commands, the plurality of meta commands being commands or sets of a command and argument;

extracting specific meta commands from the plurality of meta commands included in each of the plurality of scripts based on information on the number of occurrences of the plurality of meta commands included in each of the plurality of scripts and information on the scarcity of each of the plurality of meta commands in the plurality of scripts; and determining resemblance for a pair of scripts that are included in the plurality of scripts by calculating a probability that a same combination of meta commands that exists in the pair of scripts.

\* \* \* \* \*